(12) United States Patent
Kern et al.

(10) Patent No.: US 7,238,419 B2
(45) Date of Patent: Jul. 3, 2007

(54) WHITE OPAQUE FILM HAVING LOW TRANSPARENCY AND IMPROVED DIELECTRIC STRENGTH

(75) Inventors: Ulrich Kern, Ingelheim (DE); Ursula Murschall, Nierstein (DE); Bodo Kuhmann, Runkel (DE); Martin Jesberger, Mainz (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 11/443,992

(22) Filed: May 31, 2006

(65) Prior Publication Data
US 2006/0275593 A1 Dec. 7, 2006

(30) Foreign Application Priority Data
Jun. 1, 2005 (DE) .................. 10 2005 025 231
Jun. 1, 2005 (DE) .................. 10 2005 025 233

(51) Int. Cl.
*B32B 27/08* (2006.01)
*B32B 27/18* (2006.01)
*B32B 27/20* (2006.01)
*B32B 27/36* (2006.01)
*B32B 37/15* (2006.01)

(52) U.S. Cl. ............... 428/328; 428/347; 428/446; 428/447; 428/480; 428/910; 428/304.4; 428/318.4; 428/319.3; 428/319.7; 264/288.4; 264/290.2

(58) Field of Classification Search .............. None
See application file for complete search history.

(56) References Cited

U.S. PATENT DOCUMENTS

| | | | |
|---|---|---|---|
| 4,252,885 A | 2/1981 | McGrail et al. | |
| 4,318,950 A * | 3/1982 | Takashi et al. ............. | 428/143 |
| 4,388,454 A * | 6/1983 | Rieder et al. .............. | 528/176 |
| 4,663,228 A | 5/1987 | Bolton et al. | |
| 4,780,402 A | 10/1988 | Remmington | |
| 5,277,970 A * | 1/1994 | Schuhmann et al. ........ | 428/323 |
| 5,350,601 A | 9/1994 | Culbertson et al. | |
| 5,874,496 A * | 2/1999 | Kurz et al. ................. | 524/425 |
| 6,074,793 A * | 6/2000 | Camp et al. ................ | 430/104 |
| 6,165,700 A * | 12/2000 | Camp et al. ................ | 430/531 |
| 6,521,351 B2 * | 2/2003 | Murschall et al. ........... | 428/480 |
| 6,627,695 B2 * | 9/2003 | Murschall et al. ........... | 524/513 |
| 6,841,222 B2 * | 1/2005 | Murschall et al. ........... | 428/141 |
| 6,849,325 B2 * | 2/2005 | Murschall et al. ........... | 428/212 |
| 6,869,991 B2 * | 3/2005 | Murschall et al. ............ | 524/91 |
| 6,872,446 B2 * | 3/2005 | Murschall et al. ....... | 428/304.4 |
| 6,879,438 B2 * | 4/2005 | Masuda ....................... | 359/359 |
| 6,884,517 B2 * | 4/2005 | Peiffer et al. ............... | 428/480 |
| 6,936,350 B2 * | 8/2005 | Murschall et al. ........... | 428/480 |
| 6,939,600 B2 * | 9/2005 | Murschall et al. ........... | 428/212 |
| 7,045,200 B2 * | 5/2006 | Murschall et al. ........... | 428/220 |
| 7,090,915 B2 * | 8/2006 | Murschall et al. ........... | 428/220 |
| 2001/0029274 A1 * | 10/2001 | Murschall et al. ............ | 524/93 |
| 2002/0064650 A1 * | 5/2002 | Masuda ....................... | 428/336 |
| 2002/0136875 A1 * | 9/2002 | Murschall et al. ........... | 428/212 |
| 2002/0136879 A1 * | 9/2002 | Murschall et al. ........... | 428/220 |
| 2002/0136880 A1 * | 9/2002 | Murschall et al. ........... | 428/220 |
| 2002/0160215 A1 * | 10/2002 | Peiffer et al. ............... | 428/480 |
| 2002/0176978 A1 * | 11/2002 | Murschall et al. ........... | 428/220 |
| 2002/0187328 A1 * | 12/2002 | Murschall et al. ........... | 428/220 |
| 2003/0012937 A1 * | 1/2003 | Murschall et al. ........... | 428/220 |
| 2003/0017317 A1 * | 1/2003 | Murschall et al. ........... | 428/220 |
| 2003/0049472 A1 * | 3/2003 | Murschall et al. ........... | 428/480 |
| 2003/0055136 A1 * | 3/2003 | Murschall et al. ........... | 524/100 |
| 2003/0068511 A1 * | 4/2003 | Murschall et al. ........... | 428/480 |
| 2003/0113568 A1 * | 6/2003 | Murschall et al. ........... | 428/515 |
| 2003/0170476 A1 * | 9/2003 | Murschall et al. ........... | 428/483 |
| 2003/0170479 A1 * | 9/2003 | Peiffer et al. ............... | 428/515 |
| 2003/0224193 A1 * | 12/2003 | Murschall et al. ........... | 428/500 |
| 2004/0081840 A1 * | 4/2004 | Kiehne et al. ............... | 428/482 |
| 2004/0086732 A1 * | 5/2004 | Peiffer et al. ............... | 428/480 |
| 2005/0100718 A1 * | 5/2005 | Peiffer et al. ............... | 428/200 |
| 2006/0046041 A1 * | 3/2006 | Murschall et al. ........... | 428/220 |

FOREIGN PATENT DOCUMENTS

| | | |
|---|---|---|
| DE | 689 26 896 T2 | 3/1990 |
| EP | 0 044 515 A1 | 1/1982 |
| EP | 0 078 633 A1 | 5/1983 |
| EP | 0 144 878 A2 | 6/1985 |
| EP | 0 296 620 A2 | 12/1988 |
| EP | 0359 017 B1 | 3/1990 |
| EP | 0 515 096 A2 | 11/1992 |
| EP | 1 013 703 A2 | 6/2000 |
| EP | 1 125 967 A1 | 8/2001 |
| EP | 1125 967 A1 | 8/2001 |
| GB | 1 411 564 | 10/1975 |
| JP | 62 243120 A | 10/1987 |
| WO | WO 94/13476 A1 | 6/1994 |
| WO | WO 94/13481 A1 | 6/1994 |

OTHER PUBLICATIONS

Schimtz, Peter et al., "Fims." Ullmann's Encyclopedia of Industrial Chemistry, 5th Ed., vol. A11 (1988), pp. 85-95, 105-106, 108-110.*
H. Day, D. M. Wiles Journal Applied Polymer Science vol. 16, pp. 203-215, (1972).

* cited by examiner

*Primary Examiner*—Vivian Chen
(74) *Attorney, Agent, or Firm*—ProPat, L.L.C.

(57) ABSTRACT

The invention relates to a white opaque film formed from a crystallizable thermoplastic, preferably thermo-plastic polyester in the form of polyethylene terephthalate, barium sulfate and titanium dioxide as pigments, at least one optical brightener, and optionally at least one dye soluble in the thermoplastic. The film optionally includes, an additional functionality, e.g. in the form of an adhesive coating, of a coating with aminosilane or silicone, of UV resistance, of hydrolysis resistance, of flame retardancy, or of a sealable outer layer.

20 Claims, No Drawings

WHITE OPAQUE FILM HAVING LOW TRANSPARENCY AND IMPROVED DIELECTRIC STRENGTH

FIELD OF THE INVENTION

The invention relates to a white opaque film having low transparency and improved dielectric strength comprised of a crystallizable thermoplastic and, if appropriate, having an additional functionality. The film comprises at least barium sulfate and titanium dioxide as pigments, and also at least one optical brightener and, if appropriate, one or more dyes soluble in the thermoplastic, and, if appropriate, has at least one additional functionality. The film features good orientability, low transparency, improved dielectric strength, and also very good optical properties. The invention further relates to the use of this film and to a process for its production.

BACKGROUND OF THE INVENTION

Opaque films whose thickness is from 10 to 500 μm are known.

EP-A-1 125 967 likewise describes white opaque films comprised of crystallizable thermoplastics. However, that specification says nothing about the dielectric strength or the density of the films produced. Furthermore, those films comprise only barium sulfate and an optical brightener. In all of the examples listed, the transparency of those films is >12%, and is therefore unsuitable for the application sectors demanded here.

U.S. Pat. No. 4,780,402 describes white films with barium sulfate, and optical brightener if appropriate, and, if appropriate, incompatible polymer for adjustment of transparency. The density of all of those films is in the range from 1.1 to 1.33 kg/dm$^3$. This low density indicates a very high number of voids (vacuoles), leading to markedly impaired dielectric strength. Furthermore, the yellowness index of those films is in the negative range, i.e. the film has a blue tinge.

SUMMARY OF ADVANTAGEOUS EMBODIMENTS OF THE INVENTION

It was an object of the present invention to provide a white opaque film whose thickness is preferably from 10 to 500 μm which has not only good orientability and good optical properties and a low yellowness index but especially has high whiteness, and an additional functionality, and also low transparency, and good dielectric strength.

An additional functionality means that the inventive film has been rendered flame-retardant and/or has been modified with additional UV stabilizers, and/or has been rendered sealable, and/or, on one or both surfaces, has been coated, and/or, on one or both surfaces, has been corona-treated, and/or has been modified with hydrolysis stabilizers, and/or has been given anti-shrink properties.

Among the good optical properties are, by way of example, homogeneous, streak-free coloring, low light transmittance/transparency (thickness-dependent, for a 50 μm film preferably from 1 to 20%, in particular from 2 to 17%, particularly preferably from 3 to 15%; for a 200 μm film preferably from 0.5 to 8%, in particular from 0.6 to 7%, particularly preferably from 0.7 to 6%), and also low yellowness index YID (thickness-dependent, for a 50 μm film preferably from 1 to 15, in particular from 2 to 14, particularly preferably from 3 to 13; for a 200 μm film preferably from 1 to 50, in particular from 2 to 45, particularly preferably from 3 to 40).

High whiteness means that the Berger whiteness of the films of the invention is preferably >85%, with preference >87%, in particular >90%.

Good orientability includes the capability of the film to undergo successful longitudinal and transverse orientation during its production, without break-offs.

High dielectric strength means that the dielectric strength of a film of thickness 50 μm, measured according to DIN 53481 by the ball and plate method with alternating voltage (AC) is preferably >150 kV/mm, with preference >160 kV/mm, particularly preferably >170 kV/mm. Dielectric strength is thickness-dependent. The thicker the film, the lower the dielectric strength.

The density of the inventive film is preferably greater than 1.390 kg/dm$^3$, in particular greater than 1.392 kg/dm$^3$, particularly preferably greater than 1.394 kg/dm$^3$.

The density of the film is decisively determined by the number of vacuoles and their size. The more vacuoles and the larger the vacuoles, the lower the density. By way of example, the calculated density of a film which comprises 18% by weight of barium sulfate or titanium dioxide is 1.60 kg/dm$^3$. A measure of formation of vacuoles (voids) is what is known as the void index. The void index is defined as the quotient calculated from measured density and calculated density.

The void index of the inventive films is preferably >87%, in particular >88%, particularly preferably >89%. If the void index is 100%, measured density and calculated density are identical, i.e. there are no vacuoles.

Furthermore, the inventive film should be recyclable, in particular without impairment of dielectric strength or loss of optical and mechanical properties, in order that by way of example it can also be used for electrical insulation applications, interior applications, and in construction of exhibition stands.

DETAILED DESCRIPTION OF ADVANTAGEOUS EMBODIMENTS OF THE INVENTION

This object is achieved via a white opaque film whose thickness is preferably in the range from 10 to 500 μm, comprising, as main constituent, a crystallizable thermoplastic (the meaning of main constituent being >50% by weight, based on the total weight of the film). The film moreover comprises at least barium sulfate and titanium dioxide as pigments, at least one optical brightener, if appropriate at least one dye soluble in the thermoplastic, and has at least one additional functionality. The barium sulfate and/or the titanium dioxide and/or the optical brightener and/or the dyes can be incorporated directly at the premises of the polymer producer, or they can be fed directly in the form of masterbatches during film production. An additional method of establishing the desired low transparency here can be to use the longitudinal stretching ratio of the film.

The film of the invention comprises, as main constituent, a crystallizable thermoplastic polyester (crystallizable thermoplastic). The inventive polyester preferably contains units derived from ethylene glycol and terephthalic acid, and/or units derived from isophthalic acid, naphthalene-1,5-dicarboxylic acid, naphthalene-2,6-dicarboxylic acid, and/or biphenyldicarboxylic acid (=bibenzoic acid), and/or units derived from aliphatic or cycloaliphatic diols having from 2 to 8 carbon atoms, in particular derived from propylene glycol, methylpropylene glycol, butylene glycol, and/or cyclohexanedimethanol. Accordingly, the inventive thermoplastic polyester is preferably polyethylene terephthalate, polytrimethylene terephthalate, polybutylene terephthalate, poly(1,4-cyclohexanedimethylene terephthalate), polyethylene naphthalene-2,6-dicarboxylate, polyethylene naphthalene-1,5-dicarboxylate, polytrimethylene naphthalate, polyethylene naphthalate/bibenzoate, or another combination derived from the monomers mentioned, or else a mixture of these polyesters. Preference is given to polyethylene terephthalate (PET) and polyethylene naphthalate (PEN), and mixtures thereof. In another preferred embodiment, the polyester also contains at least 5% by weight of isophthalic acid.

For the purposes of the invention, mixtures comprised of crystallizable thermoplastic polyesters are also termed (crystallizable) thermoplastic or polyester.

The term polyethylene terephthalates or polyethylene naphthalates here is intended to mean homopolymers, compounded materials, copolymers, recycled materials, and other variants.

The inventive polyesters can, by way of example, be prepared from dimethyl terephthalate by known processes, e.g. by the transesterification process (DMT process), and suitable transesterification catalysts here are zinc salts, magnesium salts, calcium salts, manganese salts, lithium salts, or germanium salts. They can also be prepared via direct esterification (PTA process). The inventive polyesters are also available in the form of commercial products.

For the purposes of this invention, polycondensation catalysts used are antimony compounds or titanium compounds or a mixture thereof, at a concentration in the polyester of from 1 to 350 ppm (based on the metal), preferably from 2 to 250 ppm, and particularly preferably from 5 to 200 ppm.

The film of the invention can be either a single-layer film or a multilayer film.

The film comprises at least barium sulfate and titanium dioxide as pigments, the total concentration of these pigments preferably being from 0.1 to 40% by weight, based on the weight of the crystallizable thermoplastic. Titanium dioxide and barium sulfate are preferably fed by way of what is known as masterbatch technology, either separately or else together, directly during film production.

The film comprises at least one optical brightener, the amount used of this optical brightener preferably being from 1 to 25 000 ppm, particularly preferably from 2 to 15 000 ppm, with particular preference from 3 to 10 000 ppm, based on the weight of the crystallizable thermoplastic. The optical brightener, too, is preferably metered by way of what is known as masterbatch technology, directly during film production.

The inventive optical brighteners are capable of absorbing UV radiation in the range from 360 to 380 nm and of re-emitting it in the form of relatively long-wavelength, visible blue-violet light.

Examples of suitable optical brighteners are bisbenzoxazoles, cumarin derivatives (benzotriazole-cumarin, naphthotriazole-cumarin), or else bis(styryl)biphenyls. Particular preference is given to UVITEX® OB-One (Ciba Specialties, Basle, Switzerland), HOSTALUX® KS (Clariant, Germany), and also EASTOBRITE® OB-1 (Eastman). These and other suitable systems are also described in "Plastics Additives Handbook", 5th edition, Carl Hanser Verlag, Germany, 2001.

Alongside the optical brightener, one or more dyes soluble in the inventive polyester can also be added if advantageous. The amounts preferably used of the dyes, based on the weight of the crystallizable thermoplastic, are from 1 to 100 ppm, particularly preferably from 1 to 30 ppm, with particular preference from 1 to 20 ppm.

It was entirely surprising that the use of the abovementioned combination comprised of barium sulfate, titanium dioxide, optical brightener, and, if appropriate, added dyes in the films, preferably in combination with an increased longitudinal stretching ratio, led to the desired result during film production.

It is moreover very surprising that it is also possible to reuse the regrind without any significant adverse effect on the yellowness index and the dielectric strength of the film.

In one preferred embodiment, precipitated grades of barium sulfate are used. Precipitated barium sulfate is obtained from barium salts and from sulfates or sulfuric acid in the form of fine-particle colorless powder whose grain size can be controlled via the precipitation conditions. Precipitated barium sulfates can be prepared by the conventional processes described in Kunststoff-Journal 8, No. 10, 30-36 and No. 11, 36-31 (1974).

The amount of barium sulfate is preferably from 0.1 to 40%, preferably from 0.5 to 25% by weight, particularly preferably from 1 to 20% by weight, based on the weight of the thermoplastics.

The average particle size is relatively small and is preferably in the range from 0.1 to 5 μm, in particular in the range from 0.2 to 3 μm. The density of the barium sulfate used is preferably from 4 to 5 g/cm$^3$.

In one particularly preferred embodiment, the inventive film comprises, as main constituent, a crystallizable polyethylene terephthalate, and also from 0.1 to 40% by weight of precipitated barium sulfate, whose particle diameter is advantageously from 0.2 to 1 μm, particular preference being given here to BLANC® fixe XR-HX or BLANC® fixe HXH from Sachtleben Chemie.

The titanium dioxide particles used are comprised either of the anatase crystalline form or of the rutile crystalline form or of a mixture thereof, rutile being preferred. Rutile has higher hiding power than anatase. In one preferred embodiment, at least 95% by weight of the titanium dioxide particles are comprised of rutile. They can be prepared by a conventional process, e.g. by the chloride process or by the sulfate process. Their amount, based on the weight of the thermoplastic, is preferably from 0.1 to 40% by weight. The average particle size is relatively small and is preferably in the range from 0.1 to 1.0 μm.

By virtue of titanium dioxide of the type described, hardly any vacuoles are produced within the polymer matrix during film production.

The titanium dioxide particles can have a coating comprised of inorganic oxides, such as that conventionally used as a coating for white $TiO_2$ pigment in paper or paints, to improve lightfastness.

It is known that $TiO_2$ is photoactive. On exposure to UV radiation free radicals form on the surfaces of the particles. These free radicals may migrate into the polymer matrix, and this causes degradation reactions and yellowing. To avoid this, the $TiO_2$ particles may be oxidically coated. Oxides particularly suitable for the coating include those of aluminum, silicon, zinc or magnesium, or mixtures of two or more of these compounds. $TiO_2$ particles with a coating of a number of these compounds are described, for example, in EP-A-0 044 515 and EP-A-0 078 633. The coating may also comprise, or be comprised of, organic compounds having polar and nonpolar groups. The organic compounds must have sufficient thermal stability during processing of the film by extrusion of the polymer melt. Examples of polar groups are —OH; —OR; —COOX; (X=R, H or Na, R=alkyl having from 1 to 34 carbon atoms). Preferred organic compounds are alkanols and fatty acids having from 8 to 30 carbon atoms in the alkyl group, in particular fatty acids and primary n-alkanols having from 12 to 24 carbon atoms, and also polydiorganosiloxanes and/or polyorganohydro-siloxanes, e.g. polydimethylsiloxane and polymethyl-hydrosiloxane.

The coating for the titanium dioxide particles is usually comprised of from 1 to 12 g, in particular from 2 to 6 g of inorganic oxides and/or from 0.5 to 3 g, in particular from 0.7 to 1.5 g of organic compound, based on 100 g of titanium dioxide particles. The coating is usually applied to the particles in aqueous suspension. The inorganic oxides may be precipitated from water-soluble compounds, e.g. an alkali metal nitrate, in particular sodium nitrate, sodium silicate (water glass) or silica in aqueous suspension.

Inorganic oxides such as $Al_2O_3$ or $SiO_2$ also include the hydroxides or their various stages of dehydration, e.g. oxide hydrate, where the exact composition and structure of these is not known. The oxide hydrates, for example of aluminum and/or silicon, are precipitated onto the $TiO_2$ pigment after ignition and grinding in aqueous suspension, and the pigments are then washed and dried. This precipitation may therefore be carried out directly in a suspension produced in the production process after the ignition and the subsequent wet grinding. The oxides and/or oxide hydrates of the respective metals are precipitated from the water-soluble metal salts in the known pH range. For aluminum, for example, aluminum sulfate is used in aqueous solution (pH smaller than 4) and the oxide hydrate is precipitated by adding aqueous ammonia or sodium hydroxide solution in the pH range from 5 to 9, preferably from 7 to 8.5. If a water glass solution or alkali metal aluminate solution is used as starting material, the pH of the $TiO_2$ suspension initially charged should be in the strongly alkaline range (pH greater than 8). The precipitation is then carried out by adding mineral acid, such as sulfuric acid, in the pH range from 5 to 8. After precipitation of the metal oxides stirring of the suspension continues for from 15 min to about 2 hours, whereupon the precipitated layers undergo aging. The coated product is isolated from the aqueous dispersion and dried after washing at an elevated temperature, preferably at from 70 to 100° C.

In one preferred embodiment, the film of the invention comprises, alongside the crystallizable thermoplastic, which is preferably polyethylene terephthalate, from 0.1 to 40% by weight of titanium dioxide of rutile type whose particle diameter is from 0.1 to 0.5 µm, which is fed in the form of masterbatch during film production, preferably titanium dioxide from Kerr McGee (TRONOX® RFK2) or Sachtleben (HOMBITAN® class R or RC).

The inventive film moreover preferably comprises from 1 to 25 000 ppm of an optical brightener which is soluble in the crystallizable thermoplastic, particular preference being given to UVITEX® OB-One (Ciba Specialties, Basle, Switzerland), HOSTALUX® KS, or else EASTOBRITE® OB-1 (Eastman). ppm means parts by weight based on the weight of the crystallizable thermoplastic or, respectively, polyester. It is also possible to use a mixture of various optical brighteners.

The inventive film comprises, if appropriate, one or more dyes soluble in the polyester. The proportion of the dyes is preferably from 1 to 100 ppm, in particular from 1 to 30 ppm, particularly preferably from 1 to 20 ppm. The term "ppm" means parts by weight based on the weight of the polyester in which the dyes are present. It is also possible to use a mixture of various dyes.

It is advantageous for the inventive film that the dye(s) has/have, alongside their solubility in polyester, high thermal stability, and do not migrate out of the film, or become lost by evaporation from the film during the production process, thus leading to undesired deposits in the production systems. Furthermore, the dyes used for the inventive polyester films should be approved for or suitable for approval for, contact with food or drink, and for medical applications.

Soluble dyes are substances whose dispersion within the polymer is at the molecular level (DIN 55949, EN12887).

The color change of the oriented film is based on the wavelength-dependent absorption and/or scattering of light. Dyes can only absorb light and cannot scatter it, because a certain particle size is the physical precondition for scattering.

Coloring with dye is a solution process. As a consequence of this solution process, the dye has molecular-level dispersion by way of example in the polyester. Colorings of this type are termed transparent or translucent or opalescent.

Among the various classes of soluble dyes, particular preference is given to dyes soluble in oils and in aromatic substances. By way of example, these are azo dyes, phthalocyanine dyes, isoquinoline dyes, methine dyes, and anthraquinone dyes, or perinones. They are particularly suitable for the coloring of PET, because the high glass transition temperatures of PET restrict migration of the dye. (Reference J. Koerner: Lösliche Farbstoffe in der Kunststoffindustrie [Soluble dyes in the plastics industry] in "VDI-Gesellschaft Kunststoff-technik" [VDI plastics technology group]: Einfärben von Kunststoffen [Coloring of plastics], VDI-Verlag, Dusseldorf 1975).

Mixtures of two or more of these soluble dyes are also suitable.

Particularly suitable dyes are those having high molecular weight, because these dyes have little tendency to migrate out of the polymer matrix or to be lost by evaporation from the polyester during the production process. Furthermore, these dyes generally have greater thermal stability and therefore better suitability for the high processing temperatures of polyesters.

Examples of suitable soluble dyes are those supplied by Clariant with the trademark POLYSYNTHREN® or by Lanxess with the trademark MACROLEX®. Other suitable dyes are those from Ciba Specialties with trademark FILESTER®.

The following have proven particularly suitable: POLYSYNTHREN® Red FBL (anthraquinone derivative, Clariant), POLYSYNTHREN® Red GFP (perinone, Clariant), POLYSYNTHREN® Blue RBL and RLS (both anthraquinone derivative, Clariant), MACROLEX® Red 5B Gran (anthra-quinone derivative, Lanxess), MACROLEX® Red E2G Gran and EG Gran (perinones, Lanxess), MACROLEX® Blue 3R Gran (anthraquinone derivative, Lanxess), MACROLEX® Blue RR Gran (anthraquinone derivative, Lanxess), Filester Red GA (perinone, Ciba Specialties) and FILESTER® Blue GN (phthalocyanin, Ciba Specialties).

By virtue of the synergistic action of the additives barium sulfate, titanium dioxide, optical brightener, and, if appropriate, soluble dye, preferably in combination with an optimized longitudinal stretching ratio, the film is whiter, i.e. has less yellow tinge, and less transparent, i.e. has lower transparency, than a film modified only with barium sulfate.

When comparison is made with a film modified only with barium sulfate the inventive film has, for comparable total pigment content, a markedly smaller number of vacuoles, and therefore higher density. This gives the film markedly improved dielectric strength.

The standard viscosity SV (DCA) of the polyethylene terephthalate used as preferred main constituent for the film is preferably from 600 to 1100, in particular from 700 to 1000, measured in dichloroacetic acid to DIN 53728.

The intrinsic viscosity IV (DCA) is calculated as follows from the standard viscosity SV (DCA):

$$IV=[\eta]=6.907 \cdot 10^{-4} \cdot SV(DCA)+0.063096 [dl/g]$$

An inventive film can be either a single-layer film or else a multilayer film.

In the multilayer embodiment, the film is comprised of at least one core layer (B) and of at least one outer layer (A or C), and in particular a three-layer A-B-A or A-B-C structure is preferred here.

For this embodiment, it is advantageous for the standard viscosity of the polyester (preferably PET) of the core layer to be similar to that of the polyester of the outer layers adjacent to the core layer.

In one particular embodiment, the outer layers can also be comprised of a polyethylene naphthalate homopolymers or of a polyethylene terephthalate-polyethylene naphthalate copolymer, or of a compounded material. The core layer is then preferably comprised of PET.

In this embodiment, the standard viscosity of the thermoplastics of the outer layers is likewise similar to that of the polyethylene terephthalate of the core layer.

In the multilayer embodiment, the barium sulfate, the titanium dioxide, and also the optical brightener and, if appropriate, the dye(s) are preferably present in the core layer. The outer layers can also, if necessary, have been modified with the materials.

Unlike in the single-layer embodiment, the concentration of the additives here is based on the weight of the thermoplastic in the layer modified with the additives, or in the layers modified therewith.

The inventive film can moreover be recycled without difficulty, without pollution of the environment, and without loss of dielectric strength, and this makes it suitable by way of example for use as an electrical insulation film, for short-lived advertising placards, labels, or other promotional items, or for food-and-drink packaging, or as a film for medical applications, and many other uses.

The inventive film can, by way of example, be produced by an extrusion process on an extrusion line.

According to the invention, the barium sulfate, the titanium dioxide, the optical brightener, and, if appropriate, the dye(s) can be fed before the material leaves the producer of the thermoplastic polymer, or can be metered into the extruder during film production. The additives can also be fed by way of extrusion masterbatches. In the preparation of these extrusion masterbatches, the additives are added directly to the polyester and compounded together. This variant also permits feed of dyes.

It is particularly preferable that addition of the barium sulfate, of the titanium dioxide, of the optical brightener, and, if appropriate, of the dye(s) takes place by way of masterbatch technology. The additives are completely dispersed in a solid carrier material. Carrier materials that can be used are the thermoplastic itself, e.g. the polyethylene terephthalate, or else other polymers which have sufficient compatibility with the thermoplastic.

It is important that the grain size and the bulk density of the masterbatch(es) are similar to the grain size and the bulk density of the thermoplastic, so that homogeneous dispersion is achieved, and with this homogeneous whiteness, and with this homogeneous opacity and dielectric strength.

Additional Functionality

Coating

For improvement of bond strength, one or both sides of the polyester film can be provided by known processes with a conventional functional coating. Examples of materials that can be used to produce the coating are: acrylates as in WO 94/13476, ethylene-vinyl alcohols, PVDC, water glass ($Na_2SiO_4$), hydrophilic polyesters, such as PET/IPA polyester containing the sodium salt of 5-sulfoisophthalic acid (EP-A 144 878, U.S. Pat. No. 4,252,885, or EP-A 296 620), vinyl acetates (WO 94/13481), polyvinyl acetates, polyurethanes, the alkali metal or alkaline earth metal salts of $C_{10}$-$C_{18}$ fatty acids, silanes, butadiene copolymers with acrylonitrile or methyl methacrylate, methacrylic acid, acrylic acid, or an ester thereof. The coating can moreover comprise portions of from about 0.05 to 5.0% by weight, preferably from 0.1 to 3.0% by weight, in each case based on the weight of the coating liquid, of conventional additives (e.g. antiblocking agents, pH stabilizers).

The compositions or substances mentioned are applied in the form of dilute—preferably aqueous—solution, emulsion, or dispersion to one or both surfaces of the film. The solvent is then volatilized. The coating is preferably applied in-line, i.e. during the film production process, advantageously prior to transverse stretching. Particular preference is given to application by the reverse gravure-roll coating process, which gives extremely homogeneous layer thicknesses. If the in-line coatings are applied after longitudinal orientation, the heat treatment prior to transverse orientation is usually sufficient to volatilize the solvent and to dry the coating. The layer thicknesses of the dried coatings are then preferably from 5 to 100 nm, particularly preferably from 20 to 70 nm, in particular from 30 to 50 nm.

In one particular embodiment, the film has been coated with an aminosilane, as described in more detail below.

U.S. Pat. No. 4,663,228 describes the use of N-(2-aminoethyl)-3-aminopropyltrimethoxysilane, marketed with trademark Z-6020® by Dow Corning and Worlee. It describes the priming of an ionomer resin (salt of an ethylene-methacrylic acid copolymer) on glass and polycarbonate films.

DE 689 26 896 T2 describes the use of the coating on polyester films. Here, a polyester film is coated with a hydrolyzed amino-functional silane. The coating serves for direct extrusion coatability of films without additional corona treatment or additional priming, in particular on polyethylene films, ethylene copolymer films, and ethylene ionomer films or other polymer films.

None of the publications describes the very good enzyme adhesion of the coating, which was surprisingly found on a biaxially oriented polyester film with the hydrolyzed amino-functional silane coating.

The amino-functional silanes suitable as coating for the purposes of the present invention are represented in the unhydrolyzed state via the formula

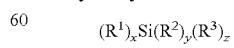

where $R^1$ is a functional group having at least one primary amino group, e.g. ethylamine, $R^2$ is a hydrolyzable group, e.g. a lower alkoxy group, an aceto group, or a halide, and $R^3$ is an unreactive, unhydrolyzable group, e.g. a lower alkyl group, or a phenyl group; where (x) is greater than or equal to 1; (y) is greater than or equal to 1; (z) is greater than or equal to zero, and x+y+z=4. Preferred chain lengths for a lower alkoxy or lower alkyl group are $C_1$-$C_8$.

The aminosilane is generally hydrolyzed in water, and it is applied by conventional processes, e.g. via spray coating or roll coating, to one or more sides of the oriented polyester film. Once the aminosilane coating has been dried, it is easy to extrude one or more polymers onto the polyester film or to use this material as polyester film with a functional coating with very good enzyme adhesion.

After hydrolysis, silanes are soluble or dispersible in water, and among these amino-functional silanes have particularly good solubility in water. A feature of hydrolyzed aminosilanes on polyester films is that they are very good adhesion promoters for extrusion-application of polymers, without any need here for corona treatment or any other coating. Surprisingly, it has been found in the present invention that the enzymes have very good adhesion to the surface of a film thus coated.

The inventive coating comprised of hydrolyzed aminosilane and present in the form of an aqueous solution and/or dispersion can be applied in-line during one of three stages of film production, and specifically in the stage prior to the first stretching process, for example as described in GB patent 1,411,564, or after the stretching stage, following the biaxial stretching process, but prior to the wind-up of the film. The heat supplied to the film during the stretching process or the final conditioning stages is generally sufficient to remove water and other volatile constituents and to dry the coating. In the event that the coating was not applied until after these heating steps, a separate drying step would be required. It is preferable that the coating is applied after monoaxial stretching of the film, i.e. after stretching of the film in one direction. The stretching preferably first takes place longitudinally before application of the coating. Examples of methods for application of the coating in this process are roller coating, spray coating, slot-coater application, or dip coating. Preference is given here to coating by gravure rolls. The monoaxially stretched film can possibly be subjected to a corona treatment in a corona discharge apparatus prior to the coating process. The corona treatment reduces the level of hydrophobic properties of the surface, thus permitting better wetting of the surface by the aqueous coating, the result of which is an improvement in the adhesion of the coating to the surface.

The form in which the hydrolyzed aminosilane is applied to the film is that of an aqueous solution whose concentration is preferably from 0.2 to 6% by weight of hydrolyzed aminosilane. To ease hydrolysis, about 0.2% by weight of a weak acid, such as acetic acid, phosphoric acid, or the like, is then added. The preferred concentration is judged in such a way that the resultant weight of the layer of the dry coating is preferably 0.5 mg/m². If the coating is applied off-line, i.e. in a separate coating procedure after manufacture of the film, the weight of the layer can also be substantially higher, however, and good results have been achieved here with dry weights of 50 mg/m² or more. The coating can be applied to one or both sides of the film; however, it is also possible to provide one side with the coating described and to provide the other side with another coating.

The coating composition can also comprise other constituents, as long as these do not impair the adhesion-promoting action of the hydrolyzed aminosilane. Examples of these are very small amounts of colloidal silicon dioxide, of dyes, of agents regulating pH, of wetting agents, and of similar materials. The coating is present in the form of a continuous layer on the surface of the film, and this expression also includes coatings with an island structure or with layer regions separated from one another.

The production waste of the coated polyester films can be used in the form of regrind. Regrind can be remelted and re-extruded for production of oriented film.

In another particular embodiment, the inventive film has been silicone-coated. Siliconized polymer films are known and are available commercially. The silicone coating is used as a release layer for labels, or is used by way of example for decorative laminates. The silicone coating of the siliconized film permits adhesion to the adhesive-coated side of the labels, while the siliconized film can easily be removed by the end user. Siliconized film can also be used as a coating for containers intended for contact with food or drink. By way of example, the siliconized film is used in pizza packaging. By virtue of the release layer, the film can very easily be peeled from the molten cheese on the pizza. The result is that serving of the pizza can be easier, without sticking of the molten cheese to the packaging.

Many release coatings based on silicone are previously known and have been described. These silicone coatings comprise formulations with crosslinking agents, and comprise substances which harden using UV light and heat, and comprise solvent-free and solvent-containing systems, and combinations, such as solvent-free systems which harden in UV light.

U.S. Pat. No. 5,350,601 describes a primer coating which comprises a glycidoxysilane and a copolyester. This primer coating, applied under the silicone layer, improves the adhesion and intactness of the silicone layer subsequently applied.

U.S. Pat. No. 5,350,601 describes a primer coating which is applied to both sides of the film and a silicone coating subsequently applied to both sides. U.S. Pat. No. 5,350,601 does not describe the primer coating of only one side of the film, the other side being uncoated or provided with another coating.

EP-A 1,013,703 describes a polyester film which has a silicone coating on one side and which comprises a slip layer on the other side, or has no coating on the other side.

HOSTAPHAN® 3SAC film is commercially available and has been equipped with a finished primer coating for subsequent siliconization on both sides. The primer coating includes an isophthalic acid/sodium salt of 5-sulfoisophthalic acid/malonic acid/ethylene glycol copolyester, a glycidoxypropyltrimethoxysilane, a colloidal silicon dioxide, and sodium lauryl sulfate. The glycidoxypropyltrimethylsilane from Dow Corning (Z-6040) and the colloidal silicon dioxide NALCO® 1060 are preferred. An inventively used subsequent coating for the siliconization process is commercially available, e.g. from Wacker Silicones Company, General Electric Silicones, and Dow Corning. HOSTAPHAN® 2SLK provides an example of a silicone-coated polyester film.

In another particular embodiment, the two sides of the film can have been provided with the same coating, or else with different coatings.

The polyester film can also, if appropriate, have been coated with $SiO_x$, aluminum, or $Al_2O_x$. The thickness of this coating is generally in the range from about 10 to 8000 nm, preferably from 30 to 4000 nm.

Corona Treatment

The film can also have been corona- or flame-treated in order to establish other desired properties. The selection of the intensity of treatment is preferably such that the surface tension of the film is generally above 45 mN/m.

Hydrolysis Resistance

In one embodiment, the thermoplastic film can have been rendered hydrolysis-resistant. Effective hydrolysis stabilizers are firstly compounds which suppress or retard hydrolysis of ester bonds. Examples of these are phenolic stabilizers. Among these are sterically hindered phenols, thiobisphenols, alkylidenebisphenols, alkylphenols, hydroxybenzyl compounds, acylaminophenols, and hydroxyphenylpropionates (in particular the pentaerythritol or 1-octadecanol ester of 3,5-di-tert-butyl-4-hydroxyphenyl-propionic acid, obtainable as IRGANOX® from Ciba Specialty Chemicals). These compounds are described by way of example in the monograph "Kunststoffadditive" [Plastics additives] by Gächter and Müller, 2nd edn., Carl Hanser Verlag. The proportion of the phenolic stabilizers is generally from 0.1 to 8.0% by weight, preferably from 0.2 to 5.0% by weight, based in each case on the weight of the film and, respectively, of the layer modified therewith (in the case of the multilayer film).

The phenolic stabilizers mentioned are preferably combined with organic phosphates, in particular with triaryl phosphites (obtainable by way of example as IRGAFOS® 168 from Ciba Specialty Chemicals). These are capable of degrading peroxides and are therefore effective as secondary stabilizers. The ratio by weight of phenolic stabilizers to organic phosphites here is generally from 10:90 to 90:10. Mixtures of primary and secondary hydrolysis stabilizers are likewise commercially available, for example as IRGANOX® B 561 or IRGANOX® B 225.

Other effective hydrolysis stabilizers are compounds which can reinstate bonds broken via hydrolysis. Monomeric or polymeric carbodiimides (specifically dicyclohexylcarbodiimide or aromatic polymeric carbodiimides, particular preference among the polymeric carbodiimides being given to those whose molecular weight is from 2000 to 50 000, obtainable as STABAXOL® P from Rhein Chemie GmbH, Mannheim, Germany), and also oxazolines, are suitable for reinstating an ester bond from a hydroxyl group and a carboxy group. The proportion of these compounds is generally from 0.1 to 5.0% by weight, preferably from 0.2 to 3.0% by weight, based in each case on the weight of the single-layer film and, respectively, on the layer modified therewith in the multilayer film.

A preferred inventive film comprises not only compounds which reduce hydrolysis rate but also compounds which can reinstate ester bonds. It is particularly resistant to moisture or water. In one preferred embodiment, the film accordingly comprises from 0.1 to 5% by weight of polymeric aromatic carbodiimides and from 0.1 to 5% by weight of a blend comprised of from 30 to 90% by weight of an organic phosphite (in particular of a triaryl phosphite) and from 70 to 10% by weight of a hydroxyl-phenylpropionate.

Other suitable hydrolysis stabilizers are mixtures of glycerol esters or are pure glycerol esters, and glycerol esters here are described by the following formula: $CH_2OR_1$—$CHOR_2$—$CH_2OR_3$, where $R_1$, $R_2$, and $R_3$ are identical or different and are defined as follows:

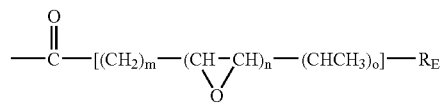

where
$R_E$=$CH_3$ or H, and
m=from 1 to 40, preferably from 7 to 20, particularly preferably from 10 to 16,
n=from 0 to 10, preferably from 1 to 4, particularly preferably from 2 to 3,
o=from 0 to 4, preferably 0, and where the sequence of the individual methylene (—$CH_2$)— (1), epoxy —(CHOCH)— (2), and ($CHCH_3$)— (3) groups is as desired, but where it is preferable that at least 2 methylene groups (1) and it is particularly preferable that at least 7 methylene groups (1) follow the carbonyl group, before one or more of the groups (2) or (3) and again (1) follow.

Examples of suitable epoxidized fatty acid glycerides of the type mentioned above are epoxidized soybean oil, epoxidized linseed oil, epoxidized sunflower oil, and epoxidized fish oil. The product POLYBIO® Hystab 10 from Schäfer Additivsysteme GmbH (Altrip, Germany) has proven particularly suitable.

The proportion of all of the hydrolysis stabilizers together is preferably from 0.2 to 16.0% by weight, preferably from 0.5 to 14.0% by weight, based in each case on the weight of the film and, respectively, of the layer modified therewith in the multilayer film.

In the multilayer embodiment, the hydrolysis stabilizer(s) is/are preferably present in the base layer. However, the outer layers and/or any intermediate layers present can, if necessary, have been modified with hydrolysis stabilizers.

Low Shrinkage

The shrinkage of the film can be adjusted via appropriate selection of the setting temperature and of the frame geometry over a wide range from 0 to about 5% longitudinally and transversely. The film preferably has low shrinkage. This means that its shrinkage both longitudinally and transversely is less than 2.5%, preferably less than 2.0%, particularly preferably less than 1.8%, when it has been heated for 15 min to 150° C. (DIN 40 634). These shrinkage values can be achieved by way of the production process, and also via subsequent off-line post-treatment. In the case of the off-line post-treatment, the film is passed very substantially without tension through a heated oven, being exposed here to a temperature in the range from 160 to 210° C. for a period of from 30 seconds to 2 minutes. Shrinkage can be adjusted during the production process via adjustment of the heat-setting temperature. The heat-setting temperature is from 180 to 260° C., in particular from 220 to 250° C.

UV Resistance

The inventive film can have been rendered UV-resistant. Light, in particular the ultraviolet content of insolation, i.e., the wavelength region from 280 to 400 nm, induces degradation in thermoplastics, as a result of which their appearance changes due to color change or yellowing, and there is also an extremely adverse effect on mechanical/physical properties of the films comprised of the thermoplastics.

Inhibition of this photooxidative degradation is of considerable industrial and economic importance, since otherwise there are drastic limitations on the applications of numerous thermoplastics. The absorption of UV light by polyethylene terephthalates, for example, starts only just below 360 nm, increases markedly below 320 nm, and is very pronounced at below 300 nm. Maximum absorption occurs at between 280 and 300 nm. In the presence of oxygen it is mainly chain cleavage which occurs, but there is no crosslinking. The predominant photooxidation products in quantity terms are carbon monoxide, carbon dioxide, and carboxylic acids. Besides direct photolysis of the ester groups, consideration has to be given to oxidation reactions which likewise form carbon dioxide via peroxide radicals. In the photooxidation of polyethylene terephthalates there can also be cleavage of hydrogen at the position a to the ester groups, giving hydroperoxides and decomposition products of these, and this may be accompanied by the chain cleavage (H. Day, D. M. Wiles: J. Appl. Polym. Sci. 16, 1972, p. 203). UV stabilizers, i.e. light stabilizers which are UV absorbers, are chemical compounds which can intervene in the physical and chemical processes of light-induced degradation. Carbon black and other pigments can give some protection from light. However, these substances are unsuitable for transparent films, since they cause discoloration or color change. UV stabilizers suitable as light stabilizers are those which preferably absorb at least 70%, with preference 80%, particularly preferably at least 90%, of the UV light in the wavelength region from 180 to 380 nm, preferably from 280 to 350 nm. These are particularly suitable if they are thermally stable in the temperature range from 260 to 300° C., that is to say they do not decompose to give cleavage products and do not cause evolution of gases. Examples of UV stabilizers suitable as light stabilizers are 2-hydroxybenzophenones, 2-hydroxybenzotriazoles, organonickel compounds, salicylic esters, cinnamic ester derivatives, resorcinol monobenzoates, oxanilides, hydroxybenzoic esters, benzoxazinones, and sterically hindered amines and triazines, and among these preference is given to the 2-hydroxybenzotriazoles, the benzoxazinones, and the triazines. It was surprising that the use of UV stabilizers in combination with hydrolysis stabilizers gives useful films with excellent properties.

The literature discloses UV stabilizers which absorb UV radiation and thus provide protection. However, when these known, commercially available UV stabilizers are used it is found that the UV stabilizer has inadequate thermal stability and, at temperatures of from 200 to 240° C., decomprises or causes evolution of gas. To prevent damage to the film, it would therefore have been necessary to incorporate large amounts (from about 10 to 15% by weight) of UV stabilizer into the film so that it gives really effective absorption of UV light. However, at these high concentrations the film yellows markedly very soon after the production process is complete. Mechanical properties, too, are adversely affected. On orientation, exceptional problems occur, e.g. break-offs due to inadequate film strength, modulus of elasticity, die deposits leading to profile variations, deposits of UV stabilizer on the rolls, leading to impairment of optical properties (marked haze, adhesion shortcomings related to inhomogeneous surface), and deposits in the stretching and setting frame, which contaminate the film.

It was therefore surprising that even low concentrations of inventive UV stabilizers achieve excellent protection from UV.

In one very particularly preferred embodiment, the inventive film comprises, as UV stabilizer, from 0.1 to 0.5% by weight of 2-(4,6-diphenyl-1,3,5-triazin-2-yl)-5-hexyloxyphenol of the formula

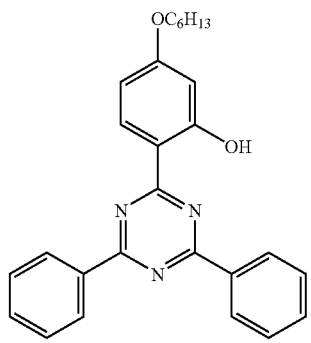

or from 0.1 to 5.0% by weight of 2,2'-methylenebis[6-benzotriazol-2-yl-4-(1,1,2,2-tetramethylpropyl)phenol] of the formula

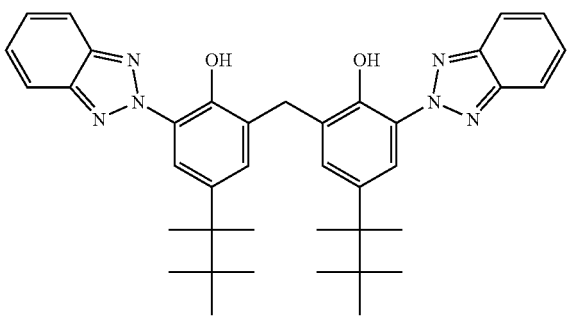

or from 0.1 to 5.0% by weight of 2,2'-1,4-phenylenebis(3,1-benzoxazin-4-one) of the formula

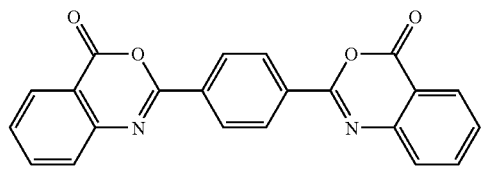

In another embodiment, it is also possible to use a mixture of these UV stabilizers, or a mixture of at least one of these UV stabilizers with other UV stabilizers. The total concentration of UV stabilizer is preferably from 0.1 to 5.0% by weight, particularly preferably from 0.5 to 3.0% by weight, based on the weight of the layer modified with the materials.

Flame Retardancy

In another embodiment, the inventive film can have been rendered flame-retardant. Flame-retardant means that in what is known as a fire protection test the film meets the requirements of DIN 4102 Part 2 and in particular the requirements of DIN 4102 Part 1, and can be classified in construction materials class B 2 and in particular B1 of the low-flammability substances. In this case, the film comprises a flame retardant, which is preferably fed directly during film production by way of what is known as masterbatch technology, the proportion of the flame retardant here being in the range from about 0.2 to 30.0% by weight, preferably from 0.5 to 25% by weight, particularly preferably from 1.0 to 20.0% by weight, based on the weight of the layer modified therewith. The proportion of the flame retardant in the masterbatch is generally from 5 to 60% by weight, preferably from 10 to 50% by weight, in each case based on the total weight of the masterbatch. Examples of suitable flame retardants are bromine compounds, chloroparaffins, and other chlorine compounds, antimony trioxide, and aluminum trihydrates. The halogen compounds sometimes have the disadvantage that they can produce halogen-containing by-products. In the event of a fire, hydrogen halides can form. Another disadvantage is that a film modified therewith has relatively low light resistance. Examples of other suitable flame retardants are organophosphorus compounds, such as carboxyphosphinic acids, their anhydrides, and dimethyl methanephosphonate. It is significant that the organophosphorus compound is soluble in the thermoplastic, because otherwise the optical properties demanded are not provided.

Organophosphorus compounds incorporated by polymerization into the thermoplastic chain have proven particularly suitable, because their use can avoid elimination of gases in the production process.

In one particular embodiment, the film comprises bis(2-hydroxyethyl)-(6H-dibenzo[c,e][1,2]oxaphosphorin-6-ylmethyl)succinate P-oxide as flame retardant.

Sealability

Where very good sealability is demanded, and where this property cannot be achieved by way of on-line coating, the inventive film preferably has a three-layer structure and then encompasses, in one particular embodiment, the base layer B, a sealable outer layer A, and an outer layer C, which is optionally sealable. If the outer layer C is likewise sealable, the two outer layers are then preferably identical.

The sealable outer layer A preferably applied by coextrusion to the base layer B is based on polyester copolymers and is comprised substantially of copolyesters comprised predominantly of isophthalic acid units, of bibenzenecarboxylic acid units, and/or terephthalic acid units and of ethylene glycol units. The remaining monomer units are derived from other aliphatic, cycloaliphatic, or aromatic diols and, respectively, dicarboxylic acids, as may also be present in the base layer. The preferred copolyesters which provide the desired sealing properties are those comprised of ethylene terephthalate units and ethylene isophthalate units. The proportion of ethylene terephthalate is preferably from 40 to 95 mol % and the corresponding proportion of ethylene isophthalate is from 60 to 5 mol %. Preference is given to copolyesters in which the proportion of ethylene terephthalate is from 50 to 90 mol % and the corresponding proportion of ethylene isophthalate is from 50 to 10 mol %, and very particular preference is given to copolyesters in which the proportion of ethylene terephthalate is from 60 to 85 mol % and the corresponding proportion of ethylene isophthalate is from 40 to 15 mol %.

For the outer layer C, or for any other intermediate layers present, use in principle may be made of the polymers used in the base layer.

The desired sealing and processing properties of the film of the invention are obtained from the properties of the copolyester used for the sealable outer layer combined with the topographies of the sealable outer layer A and of the sealable or nonsealable outer layer C.

The minimum sealing temperature, preferably 110° C., and the preferred seal seam strength of at least 1.3 N/15 mm are achieved by way of example when the copolymers described in more detail above are used for the sealable outer layer A. The best sealing properties for the film are achieved when no other additives are added to the copolymer, in particular no inorganic or organic fillers. For a given copolyester, this gives the lowest minimum sealing temperature and the highest seal seam strengths. However, in this case the handling of the film is poor, since the surface of the sealable outer layer A has a marked tendency to block. The film is more difficult to wind and is relatively unsuitable for further processing on high-speed packaging machinery. To improve the handling of the film and its processability, it is necessary to modify the sealable outer layer A. This is best done with the aid of suitable antiblocking agents of selected size, a certain concentration of which is added to the sealable layer, and specifically in such a way as firstly to minimize blocking of the film and secondly to bring about only insignificant impairment of sealing properties. Antiblocking agents, e.g. silicon dioxide, are described in EP-A-0 515 096.

Process

The polyester films can be produced by known processes from a polyester with, if appropriate, other raw materials, and also with the optical brightener, the barium sulfate, the titanium dioxide, the dye(s) if appropriate, and/or other additives, such as flame retardant, UV stabilizer, or hydrolysis stabilizer, in the amounts described, and also with other conventional additives in a conventional amount which is preferably from 0.1 to 10% by weight, either in the form of mono-films or else in the form of multilayer, if appropriate coextruded, films with identical or differently formed surfaces.

In the preferred extrusion process for production of the polyester film, the molten polyester material is extruded together with the other constituents (preferably in the form of masterbatches) through a flat-film die and quenched in the form of a substantially amorphous prefilm on a chill roll. This film is then reheated and stretched longitudinally and transversely, or transversely and longitudinally, or longitudinally, transversely, and again longitudinally and/or transversely. The stretching temperatures are preferably from $T_g+10°$ C. to $T_g+60°$ C. ($T_g$=glass transition temperature), and the longitudinal stretching ratio is preferably from 2 to 5, in particular from 2.5 to 4.5, the transverse stretching ratio being from 2 to 5, in particular from 3 to 4.5, the ratio for any second longitudinal stretching carried out if appropriate being from 1.1 to 3. The first longitudinal stretching process can, if appropriate, be carried out simultaneously with the transverse stretching process (simultaneous stretching). Heat-setting of the film then follows at oven temperatures which are preferably from 200 to 260° C., in particular from 220 to 250° C. The film is then cooled and wound up.

Completely unexpectedly, it has been found that the longitudinal stretching process parameters are variables that substantially affect the optical properties (transparency), dielectric strength, density, and formation of vacuoles. Among the longitudinal process parameters are in particular the longitudinal stretching ratio and the longitudinal stretching temperature. Entirely surprisingly, it was possible to exert a marked influence on transparency, dielectric strength, density, and the formation of vacuoles via variation of the longitudinal stretching ratio.

The surprising combination of the properties mentioned makes the inventive films suitable for a wide variety of different interior and exterior applications, for example electrical insulation applications, for interior coverings, for construction of exhibition stands and for exhibition requisites, for displays, for placards, for labels, for protective glazing of machines and of vehicles, in the lighting sector, in shopfitting, as advertising requisites, as a laminating medium, for medical applications, and for applications in the food-and-drink industry.

The table below (table 1) again collates the most important inventive properties of the film.

TABLE 1

|  |  | Preferred | Particularly preferred | Very particularly preferred | Unit | Test method |
|---|---|---|---|---|---|---|
| Content of BaSO$_4$ |  | 0.1-40 | 0.5-25 | 1.0-20 | % by wt. |  |
| Content of TiO$_2$ |  | 0.1-40 | 0.5-25 | 1.0-20 | % by wt. |  |
| Optical brightener |  | 1-25000 | 2-15000 | 3-10000 | ppm |  |
| Soluble dyes |  | 1-100 | 1-30 | 1-20 | ppm |  |
| Transparency | 50 µm | 1-20 | 2-17 | 3-15 | % | ASTM-D1003-00 |
|  | 200 µm | 0.5-8 | 0.6-7 | 0.7-6 |  |  |
| Yellowness index YID | 50 µm | 1-15 | 2-14 | 3-13 |  | ASTM 1925-70 |
|  | 200 µm | 1-50 | 2-45 | 3-40 |  |  |
| Whiteness |  | >85 | >87 | >90 | % | Berger |
| Dielectric strength (50 µm film) |  | >150 | >160 | >170 | kV/mm | DIN 53481 |
| Void index |  | >87 | >88 | >89 | % |  |
| Density |  | >1.390 | >1.392 | >1.394 | kg/dm$^3$ | ASTM-D1505 Method C |

Inventive examples are used below for further illustration of the invention.

The following standards or methods are used here for measurement of each of the properties.

Test Methods

Light Transmittance/Transparency

Light transmittance/transparency is the ratio of total transmitted light to the amount of incident light.

Light transmittance is measured to ASTM D1003-00, using Hazegard plus test equipment from Byk-Gardner GmbH, Germany.

Average Thickness

Average thickness dF is determined from the weight of a film, given known length, width, and density. A strip of film is prepared on a trimming table, having been taken from the center of a sample encompassing the entire width of the roll, and its weight is measured. The formula $$d_F[\mu m] = \frac{m[g]}{l[mm] \cdot w[mm] \cdot d[g/cm^3]} \cdot 10^{-6}$$

is used to calculate $d_F$, where:
m=weight of film section tested
l=specimen length
w=specimen width
d=density of materials tested (e.g. 1.395 g/cm$^3$ for polyester)

After trimming, each of the specimen strips is weighed on a Mettler PM 200 analytical balance (maximum load 200 g). An attached HP Vectra ES/12 computer takes all of the parameters from the OPUS program, once machine and roll number have been input, and uses these to calculate average thickness.

Yellowness Indices

The yellow index YID is measured in transmission to the standard ASTM 1925-70, using Byk-Gardner Color-Sphere test equipment.

Test conditions for Byk-Gardner Color-Sphere equipment: the geometry used is d/8 with gloss, the measurement range is from 400 to 700 nm, the spectral resolution is 20 nm, the illuminant used is D65, the observer used is 10°, and the diameter of aperture plate is 30 mm.

Whiteness

Whiteness is determined by the Berger method, and the general procedure here superposes more than 20 sheets of film. Whiteness is determined with the aid of the "ELREPHO"® electrical reflectance photometer from Zeiss, Oberkochem (Germany), standard illuminant C, 2° standard observer. Whiteness is defined as W=RY+3RZ−3RX.

W=whiteness, RY, RZ, and RX=appropriate reflection factors on using the Y, Z, and X calorimetric filter. The white standard used is a barium sulfate molding (DIN 5033, Part 9). A detailed description is given by way of example in Hansl Loos "Farbmessung" [Colorimetry], Verlag Beruf und Schule, Itzehoe, Germany (1989).

Standard Viscosity (SV) and Intrinsic Viscosity (IV)

Standard viscosity SV was measured—by a method based on DIN 53726—on a 1% strength solution in dichloro-acetic acid (DCA) at 25° C. SV (DCA)=($\eta_{rel}$−1)×1000. Intrinsic viscosity (IV) is calculated as follows from standard viscosity (SV)

IV=[η]=6.907·10$^{-4}$·SV(DCA)+0.063096[dl/g]

Surface Defects, Homogeneous Coloring

Surface defects and homogeneous coloring were determined visually.

Dielectric Strength

Dielectric strength is stated to DIN 53481 for alternating voltage (50 Hz) in the form of an average value from 10 locations tested.

Density

Density is determined to ASTM D1505, method C.

As basis for the calculated density, PET density is taken as 1.40 kg/dm$^3$, barium sulfate density is taken as 4.4 kg/dm³, and titanium dioxide density is taken as 4.2 for the rutile crystalline form and 3.9 kg/dm³ for the anatase crystalline form.

Temperature/Humidity Test (Long-Term Moisture Test)

In the temperature/humidity test (long-term moisture test), the film is stored in an autoclave at 85° C. and 95% relative humidity for 1000 h. After this period of storage, ultimate tensile strength is measured longitudinally and transversely to ISO 527-1-2. Ultimate tensile strength has to be >100 N/15 mm in order to comply with automobile industry requirements.

Heat Resistance

Heat resistance is determined to IPC TM 650 2.4.9 after 1000 h of heat-conditioning at 130° C. in a drying cabinet with air circulation. After this heat-conditioning, ultimate tensile strength to ISO 527-1-2 has to be >100 N/15 mm in order to comply with automobile industry requirements.

Mechanical Properties

Modulus of elasticity and ultimate tensile strength are measured longitudinally and transversely to ISO 527-1-2.

Shrinkage

Shrinkage is measured to DIN 40634 at 150° C. with residence time of 15 minutes.

Weathering (Bilateral), UV Resistance

UV resistance was tested as follows to the test specification of ISO 4892:

| Test equipment | Atlas Ci65 Weather-Ometer (Atlas, GB) |
|---|---|
| Test conditions | to ISO 4892, i.e. artificial weathering |
| Irradiation time | 1000 hours (per side) |
| Irradiation rate | 0.5 W/m², 340 nm |
| Temperature | 63° C. |
| Relative humidity | 50% |
| Xenon lamp | inner and outer filter comprised of borosilicate |
| Irradiation cycles | 102 minutes of UV light, then 18 minutes of UV light with water sprayed onto the specimens, then again 102 minutes of UV light, etc. |

All of the films modified with UV stabilizer were weathered bilaterally to the test specification of ISO 4892, in each case for 1000 hours per side, using the Ci65 Weather-Ometer from Atlas, and then tested for mechanical properties, discoloration, surface defects, haze, and gloss.

Fire Performance

Fire performance was determined to DIN 4102 Part 2, construction materials class B2, and to DIN 4102 Part 1, construction materials class B1.

Minimum Sealing Temperature

Hot-sealed specimens (seal seam 20 mm×100 mm) were produced using HSG/ET sealing equipment from Brugger, Germany, by sealing the film at different temperatures with the aid of two heated sealing jaws at a sealing pressure of 2 bar and with a sealing time of 0.5 s. Test strips of width 15 mm were cut from the sealed specimens. T-seal seam strength was measured as for determination of seal seam strength. The minimum sealing temperature is the temperature at which a seal seam strength of at least 0.5 N/mm² is achieved.

Seal Seam Strength

To determine seal seam strength, two film strips of width 15 mm were mutually superposed and sealed at 130° C. with a sealing time of 0.5 s and a sealing pressure of 2 bar (equipment: NDS from Brugger, Germany, single-side heated sealing jaw. Seal seam strength was determined by the T-peel method.

Surface Tension

Surface tension is measured by the contact angle measurement method. The determination uses a G1 goniometer from Krüss GmbH, Germany. Distilled water is used as liquid. The specimen is taken from the center of an assemblage of sheets and measured directly.

Each of the inventive examples and comparative examples below involves a white opaque film which is produced on the extrusion line described. The longitudinal stretching ratio is 1:3.1, if not indicated otherwise.

EXAMPLES

The following polymers were used for production of the white opaque films:

P1 polymer comprising, alongside PET, 18% by weight of barium sulfate (BLANC FIXE® XR-HX, Sachtleben Chemie), 600 ppm of optical brightener (HOSTALUX®, Clariant, Germany), and 4 ppm of blue dye (POLYSYNTHREN® Blue RLS, Clariant). The SV value of the polymer is 810.

P2 polymer comprising, alongside PET, 50% by weight of titanium dioxide (rutile form, 0.2 μm particle diameter, Kerr McGee). The SV value of the polymer is about 730.

P3 polymer comprising, alongside PET, 4 ppm of blue dye (POLYSYNTHREN® Blue RLS, Clariant), and also 2 ppm of red dye (MACROLEX® Red 5B Gran, Lanxess), but no pigments of any type ("clear polymer"). The SV value is 810. The polymer was prepared by means of a titanium polycondensation catalyst.

P4 polymer based on antimony trioxide as poly-condensation catalyst, comprising no other additives alongside PET.

P5 as P2, but also comprises 300 ppm of HOSTALUX® as optical brightener.

P6 polymer comprising, alongside PET, 22 500 ppm of silicon dioxide (SYLOBLOC®, Grace, Germany) as anti-blocking agent.

P7 polymer comprising, alongside PET, 20% by weight of TINUVIN® 1577 UV stabilizer (Ciba Specialties, Basle, Switzerland) and 10 ppm of blue dye (POLYSYNTHREN® Blue RLS, Clariant).

P8 polymer comprising, alongside PET, 17.2% by weight of bis(2-hydroxyethyl)-(6H-dibenzo[c,e]-[1,2]oxaphosphorin-6-ylmethyl)succinate P-oxide, condensed into the polymer chain.

P9 copolyester comprised of 78 mol % of ethylene terephthalate and 22 mol % of ethylene isophthalate (prepared by way of the transesterification process using Mn as transesterification catalyst, Mn concentration: 100 ppm).

P10 polymer comprising, alongside PET, 20% by weight of POLYBIO® Hystab 10 (Schäfer Additive-System GmbH, Altrip, Germany).

P11 as P3, but also comprising 1000 ppm of Irganox® 1010 hydrolysis stabilizer (Ciba Specialties, Basle, Switzerland).

Inventive Example 1 (IE1)

A film of thickness 50 μm was produced with the following formulation:
20% by weight of clear polymer P3
50% by weight of regrind of the same material, produced from cut film arising within the process,
22% by weight of polymer P1
8% by weight of polymer P2

The film therefore comprises overall 8% by weight of barium sulfate, 8% by weight of titanium dioxide, 264 ppm of optical brightener, 0.8 ppm of red dye, and also 3.36 ppm of blue dye.

The longitudinal stretching ratio during production of the film was 1:3.1.

Inventive Example 2 (IE2)

Inventive example 1 was repeated. However, in contrast to inventive example 1, the thickness of the film produced was 250 μm. The longitudinal stretching ratio during production of the film was 2.9.

Inventive Example 3 (IE3)

Inventive example 1 was repeated. However, in contrast to inventive example 1, the longitudinal stretching ratio during production of the film was 1:3.4.

Inventive Example 4 (IE4)

As in inventive example 1, a film of thickness 50 μm was produced with the following formulation:
14% by weight of clear polymer P4
50% by weight of regrind of the same material, produced from cut film arising within the process,
28% by weight of polymer P1
8% by weight of polymer P2

The film therefore comprises overall 10% by weight of barium sulfate, 8% by weight of titanium dioxide, 336 ppm of optical brightener, and also 2.2 ppm of blue dye.

The longitudinal stretching ratio during production of the film was again 1:3.1 here, as in inventive example 1.

Inventive Example 5 (IE5)

Inventive example 4 was repeated. However, in contrast to inventive example 4 the thickness of the film produced was 250 μm. The longitudinal stretching ratio during production of the film was 2.9.

Inventive Example 6 (IE6)

Inventive example 4 was repeated. In contrast to inventive example 4, the longitudinal stretching ratio during production of the film was 1:3.4.

Inventive Example 7 (IE7)

Inventive example 4 was repeated, but with the modification that P5 was used instead of P2.

The film therefore comprised 10% by weight of barium sulfate, 8% by weight of titanium dioxide, 384 ppm of optical brightener, and also 2.2 ppm of blue dye.

Inventive Example 8 (IE8)

An ABA film of thickness 50 μm was produced with the following formulation:
Co-ex layers A, each of thickness 2 μm
93% by weight of polymer P4
7% by weight of polymer P6
Base layer B, thickness 46 μm Identical with formulation from inventive example 4

Inventive Example 9 (IE9)

After the longitudinal stretching process, one side of the film of inventive example 1 (IE1) is coated by means of a reverse gravure roll coating process with an aqueous dispersion. The dispersion comprises, alongside water, 4.2% by weight of hydrophilic polyester (PET/IPA polyester containing sodium salt of 5-sulfo-isophthalic acid, SP41®, Ticona, USA), 0.15% by weight of colloidal silicon dioxide (NALCO® 1060, Deutsche Nalco Chemie, Germany) as antiblocking agent, and also 0.15% by weight of ammonium carbonate (Merck, Germany) as pH buffer. The wet application weight is 2 g/m² per coated side. Calculated thickness of the coating is 40 nm after the transverse stretching process.

Inventive Example 10 (IE10)

A film of thickness 50 μm was produced with the following formulation:
17% by weight of clear polymer P3
50% by weight of regrind of the same material, produced from cut film arising within the process,
22% by weight of polymer P1
8% by weight of polymer P2
3% by weight of polymer P7

The film therefore comprises overall 8% by weight of barium sulfate, 8% by weight of titanium dioxide, 264 ppm of optical brightener, 1.2% by weight of UV stabilizer, and also red and blue dye.

Inventive Example 11 (IE11)

A film of thickness 50 μm was produced with the following formulation:
22% by weight of polymer P1
8% by weight of polymer P2
50% by weight of regrind of the same material, produced from cut film arising within the process,
20% by weight of polymer P8

The film therefore comprises overall 8% by weight of barium sulfate, 8% by weight of titanium dioxide, 264 ppm of optical brightener, 6.9% by weight of flame retardant, and also red and blue dye.

Inventive Example 12 (IE12)

A coextruded ABC film of thickness 50 μm was produced with the following formulation:
Co-ex layer A, thickness 2 μm
93% by weight of polymer P3
7% by weight of polymer P6

Base layer B, thickness 46 μm Identical with formulation from inventive example 1
Coextrusion layer C, thickness 2 μm
97% by weight of polymer P9
3% by weight of polymer P6

Inventive Example 13 (IE13)

A film of thickness 50 μm was produced with the following formulation:
20% by weight of clear polymer P11
50% by weight of regrind of the same material, produced from cut film arising within the process,
22% by weight of polymer P1
8% by weight of polymer P2
The film therefore comprises overall 8% by weight of barium sulfate, 8% by weight of titanium dioxide, 264 ppm of optical brightener, 400 ppm of Irganox 1010, and also red and blue dye.

Inventive Example 14 (IE14)

A film of thickness 50 μm was produced with the following formulation:
10% by weight of clear polymer P3
50% by weight of regrind of the same material, produced from cut film arising within the process,
22% by weight of polymer P1
8% by weight of polymer P2
10% by weight of polymer P10
The film therefore comprises overall 8% by weight of barium sulfate, 8% by weight of titanium dioxide, 264 ppm of optical brightener, 4% by weight of hydrolysis stabilizer, and also red and blue dye.

Inventive Example 15 (IE15)

Film from inventive example 9 is post-treated in an oven using a temperature of 200° C. and a residence time of 60 seconds, very substantially without tension.

Inventive Example 16 (IE16)

As in inventive example 10, a white opaque, UV-resistant film is produced with thickness 50 μm. One side of the film is corona-treated. The intensity selected is such that the surface tension is >45 mN/m.

Comparative Example 1 (CE1)

Example 1 from EP-A-1 125 967 was repeated.
Accordingly, a white opaque film of thickness 50 μm was produced and comprised, as main constituent, polyethylene terephthalate (RT32, Invista, Germany), 18% of barium sulfate (BLANC FIXE® XR-HX, Sachtleben Chemie), 200 ppm of optical brightener (TINOPA®, Ciba-Geigy, Basle), and 40 ppm of blue dye (SUDAN BLUE® 2, BASF, Ludwigshafen, Germany). The longitudinal stretching ratio established during production of the film is 3.1.

Comparative Example 2 (CE2)

A film of thickness 50 μm was produced with the following formulation:
16% by weight of clear polymer P2
34% by weight of polymer P4
50% by weight of regrind of the same material, produced from cut film arising within the process Comparative Example 3 (CE3)

Example 1 from application U.S. Pat. No. 4,780,402 was repeated. The film of thickness 130 μm accordingly comprised 25% by weight of barium sulfate whose average particle size was 6 μm, no optical brightener, and no dye.

Comparative Example 4 (CE4)

A film of thickness 50 μm was produced with the following formulation:
34% by weight of clear polymer P3
50% by weight of regrind of the same material, produced from cut film arising within the process,
16% by weight of polymer P2
The film therefore comprises overall 16% by weight of titanium dioxide, and also red and blue dye, but not barium sulfate and no optical brightener.

Comparative Example 5 (CE5)

A film of thickness 50 μm was produced with the following formulation:
3% by weight of clear polymer P3
50% by weight of regrind of the same material, produced from cut film arising within the process,
44% by weight of polymer P1
3% by weight of polymer P7
The film therefore comprises overall 16% by weight of barium sulfate, UV stabilizer, optical brightener, and also red and blue dye, but no titanium dioxide.

Comparative Example 6 (CE6)

By analogy with comparative example 5, a film of thickness 50 μm was produced with the following formulation:
6% by weight of clear polymer P3
50% by weight of regrind of the same material, produced from cut film arising within the process,
44% by weight of polymer P1
The film therefore comprises overall 16% by weight of barium sulfate, optical brightener, and also red and blue dye, but no titanium dioxide and no UV stabilizer.
Table 2 below collates the most important properties of the films mentioned.
It is apparent here that the films of CE1-CE6 have shortcomings when compared with the inventive films IE1-IE16 in particular in the combination of the following properties: transparency, yellowness index, whiteness, and dielectric strength.

TABLE 2

| Property profile of films produced | | | | | | | |
|---|---|---|---|---|---|---|---|
| | Unit | IE1 | IE2 | IE3 | IE4 | IE5 | IE6 |
| Film structure | | B | B | B | B | B | B |
| Thickness | [μm] | 50 | 250 | 50 | 50 | 250 | 50 |

TABLE 2-continued

Property profile of films produced

| | | | | | | | | |
|---|---|---|---|---|---|---|---|---|
| Transparency | | [%] | 16.5 | 6.5 | 10.5 | 14.0 | 3.8 | 8.7 |
| Yellowness index (YID) | | | 9 | 45 | 7 | 5.5 | 33 | 4.9 |
| Whiteness (Berger) | | | 108 | 107 | 109 | 113 | 112 | |
| Ultimate tensile strength | longitudinal transverse | [N/mm] | | | | | | |
| Modulus of elasticity | longitudinal transverse | [N/mm] | | | | | | |
| Density | measured calculated | kg/dm³ | 1.41 1.57 | 1.48 1.57 | 1.39 1.57 | 1.42 1.59 | 1.49 1.59 | 1.39 1.59 |
| Void index | | % | 89.8 | 94.3 | 88.6 | 89.1 | 93.5 | 87.2 |
| Dielectric strength | | kV/mm | 174 | 98 | 163 | 171 | 96 | 160 |
| Temperature/ humidity test (passed: yes/no) | | | | | | | | |
| Heat resistance | | | | | | | | |
| UV resistance (absorption) | | [nm] | | | | | | |
| Flame resistance (fire class) | | | | | | | | |
| Coating (adhesion) | | | | | | | | |
| Minimum sealing temperature (A/A) | | [° C.] | | | | | | |
| Seal seam strength (A/A) | | [N/15 mm] | | | | | | |
| Surface tension | | [mN/m] | | | | | | |
| Shrinkage | longitudinal transverse | [%] | | | | | | |
| Surface defects | | visual | none | none | none | none | none | none |
| Coloring | | visual | homogeneous | homogeneous | homogeneous | homogeneous | homogeneous | homogeneous |

| | | Unit | IE7 | IE8 | IE9 | IE10 | IE11 | IE12 |
|---|---|---|---|---|---|---|---|---|
| Film structure | | | B | ABA | B | B | B | ABC |
| Thickness | | [μm] | 50 | 50 | 50 | 50 | 50 | 50 |
| Transparency | | [%] | 14.4 | 14.9 | 16.5 | 16.5 | 16.5 | 17.5 |
| Yellowness index (YID) | | | 4.2 | 4.8 | 9.0 | 7.3 | 9.4 | 8.7 |
| Whiteness (Berger) | | | 114 | 117 | 112 | 108 | 108 | 107 | 104 |
| Ultimate tensile strength | longitudinal transverse | [N/mm] | | | 165 205 | 165 205 | 165 205 | 175 230 |
| Modulus of elasticity | longitudinal transverse | [N/mm] | | | 4100 4850 | 4100 4850 | 4100 4850 | 4200 5100 |
| Density | measured calculated | kg/dm³ | 1.41 1.59 | 1.41 1.58 | 1.41 1.57 | 1.41 1.57 | 1.41 1.57 | 1.40 1.56 |
| Void index | | % | 88.5 | 89.9 | 89.8 | 89.8 | 89.8 | 89.7 |
| Dielectric strength | | kV/mm | 170 | 175 | 174 | 174 | 172 | 177 |
| Temperature/ humidity test (passed: yes/no) | | | | | no | no | no | no |
| Heat resistance | | | | | poor | poor | poor | poor |
| UV resistance (absorption) | | [nm] | | | <380 | <290 | <380 | <380 |
| Flame resistance (fire class) | | | | | — | — | B1, B2 | — |
| Coating (adhesion) | | | | | ++ | — | — | — |
| Minimum sealing temperature (A/A) | | [° C.] | | | >160 | >160 | >160 | 96 |
| Seal seam strength (A/A) | | [N/15 mm] | | | <0.5 | <0.5 | <0.5 | 2.4 |
| Surface tension | | [mN/m] | | | 40 | 40 | 40 | 40 |
| Shrinkage | longitudinal transverse | [%] | | | 1.0 0.8 | 1.0 0.8 | 1.0 0.8 | 0.7 0.3 |
| Surface defects | | | none | none | none | none | none | none |
| Coloring | | | homogeneous | homogeneous | homogeneous | homogeneous | homogeneous | homogeneous |

| | | Unit | IE13 | IE14 | IE15 | IE16 | CE1 | CE2 |
|---|---|---|---|---|---|---|---|---|
| Film structure | | | B | B | B | B | B | B |
| Thickness | | [μm] | 50 | 50 | 50 | 50 | 50 | 50 |
| Transparency | | [%] | 16.5 | 16.5 | 16.5 | 16.5 | 20.0 | 15.0 |
| Yellowness index (YID) | | | 8.8 | 8.7 | 9 | 7.3 | 12 | 36 |
| Whiteness (Berger) | | | 108 | 107 | 108 | 108 | 93 | 96 |
| Ultimate tensile strength | longitudinal transverse | [N/mm] | 165 205 | 165 205 | 165 205 | 165 205 | | |
| Modulus of elasticity | longitudinal transverse | [N/mm] | 4100 4850 | 4100 4850 | 4100 4850 | 4100 4850 | | |

TABLE 2-continued

Property profile of films produced

| | | | | | | | | |
|---|---|---|---|---|---|---|---|---|
| Density | measured | kg/dm³ | 1.41 | 1.41 | 1.41 | 1.41 | 1.42 | 1.46 |
| | calculated | | 1.57 | 1.57 | 1.57 | 1.57 | 1.60 | 1.48 |
| Void index | | % | 89.8 | 89.8 | 89.8 | 89.8 | 89.0 | 98.7 |
| Dielectric strength | | kV/mm | 175 | 175 | 174 | 174 | 168 | 176 |
| Temperature/humidity test (passed: yes/no) | | | yes | yes | no | no | | |
| Heat resistance | | | good | very good | poor | poor | | |
| UV resistance (absorption) | | [nm] | <380 | <380 | <380 | <290 | | |
| Flame resistance (fire class) | | | — | — | — | — | | |
| Coating (adhesion) | | | — | — | — | >160 | | |
| Minimum sealing temperature (A/A) | | [° C.] | >160 | >160 | >160 | | | |
| Seal seam strength (A/A) | | [N/15 mm] | <0.5 | <0.5 | <0.5 | <0.5 | | |
| Surface tension | | [mN/m] | 40 | 40 | 40 | 48 | | |
| Shrinkage | longitudinal | [%] | 1.0 | 1.0 | 0.3 | 1.0 | | |
| | transverse | | 0.8 | 0.8 | 0.0 | 0.8 | | |
| Surface defects | visual | | none | none | none | none | none | none |
| Coloring | visual | | homogeneous | homogeneous | homogeneous | homogeneous | homogeneous | homogeneous |

| | | Unit | CE3 | CE4 | CE5 | CE6 |
|---|---|---|---|---|---|---|
| | Film structure | | B | B | B | B |
| | Thickness | [µm] | 130 | 50 | 50 | 50 |
| | Transparency | [%] | 8.5 | 7 | 26 | 24 |
| | Yellowness index (YID) | | n/a | 45 | 12.1 | 2.2 |
| | Whiteness (Berger) | | n/a | 98 | 106 | 115 |
| | Ultimate tensile strength | longitudinal | [N/mm] | | 180 | 175 | 175 |
| | | transverse | | | 220 | 205 | 205 |
| | Modulus of elasticity | longitudinal | [N/mm] | | 4400 | 4250 | 4250 |
| | | transverse | | | 5100 | 4950 | 4950 |
| | Density | measured | kg/dm³ | 1.32 | 1.48 | 1.36 | 1.36 |
| | | calculated | | 1.69 | 1.57 | 1.57 | 1.57 |
| | Void index | | % | 78.2 | 94.3 | 86.6 | 86.6 |
| | Dielectric strength | | kV/mm | n/a | 176 | 168 | 168 |
| | Temperature/humidity test (passed: yes/no) | | | | no | no | no |
| | Heat resistance | | | | poor | poor | poor |
| | UV resistance (absorption) | | [nm] | | <380 | <290 | <380 |
| | Flame resistance (fire class) | | | | — | — | — |
| | Coating (adhesion) | | | | — | — | — |
| | Minimum sealing temperature (A/A) | | [° C.] | | >160 | >160 | >160 |
| | Seal seam strength (A/A) | | [N/15 mm] | | <0.5 | <0.5 | <0.5 |
| | Surface tension | | [mN/m] | | 40 | 40 | 40 |
| | Shrinkage | longitudinal | [%] | | 1.0 | 1.0 | 1.0 |
| | | transverse | | | 0.8 | 0.8 | 0.8 |
| | Surface defects | visual | | none | none | none | none |
| | Coloring | visual | | homogeneous | homogeneous | homogeneous | homogeneous |

The invention claimed is:

1. A white opaque film comprising (i) crystallizable thermoplastic consisting essentially of polyethylene terephtalate, polytrimethylene terephthalate, polybutylene terephthalate, poly(1,4-cyclohexanedimethylene terephthalate), polyethylene naphthalene-2,6-dicarboxylate, polyethylene naphtalene-1,5-dicarboxylate, polytrimethylene naphthalate, polyethylene naphthalate/bibenzoate or mixtures thereof or derivates thereof, (ii) barium sulfate, (iii) titanium dioxide, (iv) at least one optical brightener, and (v) at least one dye, soluble in the thermoplastic wherein said film exhibits
   a yellowness index of 1 to 15, based on a 50 micron film;
   a dielectric strength of greater than 150 kV/mm;
   and a transparency of 1 to less than 20%, based on a 50 micron film.

2. The film as claimed in claim 1, wherein the proportion of the crystallizable thermoplastic is greater than 50% by weight, based on the total weight of the film.

3. The film as claimed in claim 1, wherein a crystallizable thermoplastic polyester is used as crystallizable thermoplastic.

4. The film as claimed in claim 3, wherein the thermoplastic polyester has units derived from ethylene glycol and terephthalic acid and/or units derived from isophthalic acid, naphthalene-1,5-dicarboxylic acid or naphthalene-2,6-dicarboxylic acid.

5. The film as claimed in claim 4, wherein polyethylene terephalate, polyethylene naphthalate or a mixture of these is used as thermoplastic polyester.

6. The film as claimed in claim 1, which comprises from 1 to 20% by weight of barium sulfate and from 1 to 20% by weight of titanium dioxide, based in each case on the weight of the thermoplastic of the modified therewith layer.

7. The film as claimed in claim 1, said film comprising from 1 to 25 000 ppm of optical brighteners, based on the weight of the thermoplastic of the layer modified therewith.

8. The film as claimed in claim 1, said film further comprising from 1 to 100 ppm of dyes soluble in the thermoplastic, based on the weight of the thermoplastic comprising the dyes.

9. The film as claimed in claim 1, said film comprising a base layer B, and one or two outer layers, wherein said outer layers may be identical or different.

10. The film as claimed in claim 9, wherein the outer layer(s) comprise polyethylene terephthalate, polyethylene naphthalate, or a polyethylene terephthalate-polyethylene naphthalate copolymer.

11. The film as claimed in claim 1, wherein said film exhibits a whiteness of greater than 85%.

12. The film as claimed in claim 1, wherein said film exhibits a void index of greater than 87%.

13. The film as claimed in claim 1, wherein said film exhibits a density greater than 1.39 kg/dM$^3$.

14. The film as claimed in claim 1, wherein said film has an additional functionality.

15. The film as claimed in claim 14, wherein one or both sides of the film comprises an adhesive coating, an aminosilane coating, or a silicone coating.

16. The film as claimed in claim 14, wherein said additional functionality is selected from corona-treatment, hydrolysis-resistance, UV-stabilization, or flame-retardance.

17. The film as claimed in claim 14, wherein said film has a longitudinal and transverse shrinkage smaller than 2.5% when said film is heated to 150° C. over a period of 15 min.

18. The film as claimed in claim 14, wherein said film has at least one sealable outer layer.

19. A process for production of a film as claimed in claim 1, said process comprising:
   a) producing a film via extrusion or coextrusion,
   b) biaxially stretching the film, and
   c) heat-setting the stretched film.

20. Electrical insulation, interior coverings, protective glazing, placards, labels, medical applications, or food-and-drink applications comprising film as claimed in claim 1.

* * * * *